United States Patent [19]

Sugano

[11] Patent Number: 4,938,103
[45] Date of Patent: Jul. 3, 1990

[54] FRICTION ELEMENT ENGAGEMENT PRESSURE AND TIMING CONTROL ARRANGEMENT FOR AUTOMATIC TRANSMISSION

[75] Inventor: Kazuhiko Sugano, Yokohama, Japan

[73] Assignee: Nissan Motor Co., Ltd., Yokohama, Japan

[21] Appl. No.: 264,720

[22] Filed: Oct. 31, 1988

[30] Foreign Application Priority Data

Oct. 30, 1987 [JP] Japan .................. 62-273217

[51] Int. Cl.⁵ ............................. B60K 41/10
[52] U.S. Cl. ........................ 74/867; 74/868
[58] Field of Search ............ 74/867, 868, 869

[56] References Cited

U.S. PATENT DOCUMENTS

| 3,710,638 | 1/1973 | Sakai | 74/867 X |
| 4,200,008 | 4/1980 | Dach | 74/867 X |
| 4,291,596 | 9/1981 | Sakakibara | 74/867 |
| 4,677,879 | 7/1987 | Furusawa et al. | 74/867 X |
| 4,776,240 | 10/1988 | Miki | 74/869 |

FOREIGN PATENT DOCUMENTS 61-175357 8/1986 Japan .

Primary Examiner—Leslie A. Braun
Assistant Examiner—Harold F. Macris
Attorney, Agent, or Firm—Foley & Lardner, Schwartz, Jeffery, Schwaab, Mack, Blumenthal & Evans

[57] ABSTRACT

An accumulator which is pressurized during the engagement of the band brake, is arranged with a one-way valve so that the discharge therefrom, which accompanies the downshifting of an associated shift valve, temporarily maintains a pressure which is supplied to an overrunning clutch control valve and which holds the spool valve elements therein in a position wherein the overrunning clutch is drained.

6 Claims, 4 Drawing Sheets

FIG. 4

| | | R/C | H/C | F/C | O/C | B/B 2A | B/B 3R | B/B 4A | L&R/B | F/O | L/O | GEAR RATIO | $\alpha_1 = 0.45$ $\alpha_2 = 0.45$ |
|---|---|---|---|---|---|---|---|---|---|---|---|---|---|
| D RANGE | ENGINE DRIVING 1ST | | | ○ | | | | | | ○ | ○ | $\dfrac{1+\alpha_1}{\alpha_1}$ | 3.22 |
| | 2ND | | | ○ | | | ○ | | | ○ | | $\dfrac{\alpha_1+\alpha_2+\alpha_1\alpha_2}{\alpha_1(1+\alpha_2)}$ | 1.69 |
| | 3RD | | ○ | ○ | | | | | | ○ | | 1 | 1 |
| | 4TH | | ○ | (○) | | | | ○ | | | | $\dfrac{1}{1+\alpha_2}$ | 0.69 |
| | ENGINE BRAKING 1ST | | | (○) | ○ | | | | | | | | |
| | 2ND | | | (○) | ○ | | ○ | | | | | | |
| | 3RD | | ○ | (○) | ○ | | | | | | | | |
| | 4TH | | ○ | (○) | | | | ○ | | | | | |
| 2ND RANGE | 1ST | | | ○ | | ○ | | | | ○ | | | |
| | 2ND | | | ○ | | ○ | ○ | | | ○ | | | |
| 1ST RANGE | 1ST | | | ○ | | ○ | ○ | | ○ | | ○ | | |
| REVERSE | | ○ | | | | | | | ○ | | | $-\dfrac{1}{\alpha_2}$ | −2.22 |

( ) UNRELATED TO POWER TRANSMISSION

FRICTION ELEMENT ENGAGEMENT PRESSURE AND TIMING CONTROL ARRANGEMENT FOR AUTOMATIC TRANSMISSION

BACKGROUND OF THE INVENTION

1. Field of the Invention

The present invention relates generally to an automatic transmission and more specifically to a control circuit for an automatic transmission which features a single valve which provided both timing and pressure level control during transmission downshifting.

2. Description of the Prior Art

JP-A No. 61-175357 discloses a control arrangement which includes a 4-3 sequence valve which is used to suppress select shock when the select lever is moved in a manner which induces a 4-3 downshift. That is to say, the friction elements which are used to produce 4th speed are connected with an accumulator and when a 4-3 downshift is induced, the pressure which holds the friction elements in their engaged state is reduced gently. With this arrangement, until the pressure falls below a predetermined value the 4-3 sequence valve does not change position. As this valve is arranged to control the supply of hydraulic fluid to the overrunning clutch until the fourth speed inducing friction elements are sufficiently depressurized, the overunning clutch cannot be engaged. This arrangement thus obviates the generation of shift shock due to partial engagement of the overruning clutch while the friction elements fourth speed is still capable of transmitting torque.

However, with this prior art arrangement since the overrunning clutch is engaged with unmodified line pressure it is not possible to adjust the amount of torque which is transmitted thereby unless a pressure reducing valve is additionally provied. Unfortunately, the provision of this valve induces the drawbacks of increased size and complexity of the control circuit.

SUMMARY OF THE INVENTION

It is an object of the present invention to provide a single value control circuit which is responsive to the release timing of a selected friction element in a mannner to time both the supply and the level of the pressure fed to another element which is engaged to produce another transmission gear ratio.

In brief, the above object is achieved by an arrangement wherein an accumulator which is pressurized during the engagement of the band brake, is arranged with a one-way valve so that the discharge therefrom, which accompanies the downshifting of an associated shift valve, temporarily maintains a pressure which is supplied to an overrunning clutch control valve and which holds the spool valve elements therein in a position wherein the overrunning clutch is drained.

More specifically, a first aspect of the present invention is deemed to comprise a transmission having a nth speed friction element and a n-1 speed overrunning clutch which produces engine braking when engaged, and which features: a overrunning clutch control valve; and an accumulator which is pressurized when said n speed friction element is engaged; said overrunning control valve including a bore in which first and second spool valve elements are reciprocatively disposed, said second spool valve element having a diameter which is larger than that of the first spool valve element, said first and second spool valve elements being arranged so that when said transmission is conditioned to produce said n-1 speed said first spool valve element modifies a supply of hydraulic pressure under pressure in manner to supply a pressure having a predetermined level to said overrunning clutch, said first and second spool valve elements being arranged so that when said first spool valve element is engaged by said second spool valve element in a manner to be biased by the engagement the supply of said predetermined pressure to said overrunning clutch is cut-off, said second spool valve element being exposed at one end to the pressure in said n speed friction element in a manner to be biased toward said first spool valve element.

A second aspect of the present invention is deemed to comprise a transmission which features: a first friction element, said first friction element inducing a nth speed when engaged; an accumulator associated with said first friction element, said accumulator being arranged to be pressurized when said first friction element is engaged, a shift valve; conduit means for fluidly communicating said shift valve with said first friction element and said accumulator, said shift valve being arranged to supply hydraulic pressure to said first friction element and said accumulator in when conditioned to assume a nth speed position, said conduit means being arranged to permit hydraulic pressure to be supplied freely from said shift and to restrict the drainage of hydraulic pressure via said shift valve when said shift valve is conditioned to assume a n-1 speed position; a second friction element, said second friction element inducing engine braking when engaged and said transmission is conditioned to produce an n-1 speed; a control valve valve interposed between a source of hydraulic pressure and said second friction element, said control valve comprising: a first spool valve element reciprocatively disposed in a bore, said first spool valve element being arranged to have a first position wherein said second friction element is drained and a second position wherein communication between said source and second second friction element is established and the pressure which is supplied to said second friction element is controlled to a predetermined level; a spring which biases said first spool valve element toward said second position; a second spool valve element, said second spool valve element being exposed to the pressure which prevails in said first friction element in manner wherein, while the pressure which is prevailing in said first friction element is above a predetermined level, said second spool valve element is biased toward and into engagement with said first spool valve element which sufficient force to overcome said spring and to move said first spool valve element into said first position.

BRIEF DESCRIPTION OF THE DRAWINGS

FIG. 4 is a table showing the relationship between the friction element engagement and the gear ratio produced by the transmission arrangement shown in FIGS. 2 and 3.

DETAILED DESCRIPTION OF THE PREFERRED EMBODIMENTS

Figure 2:
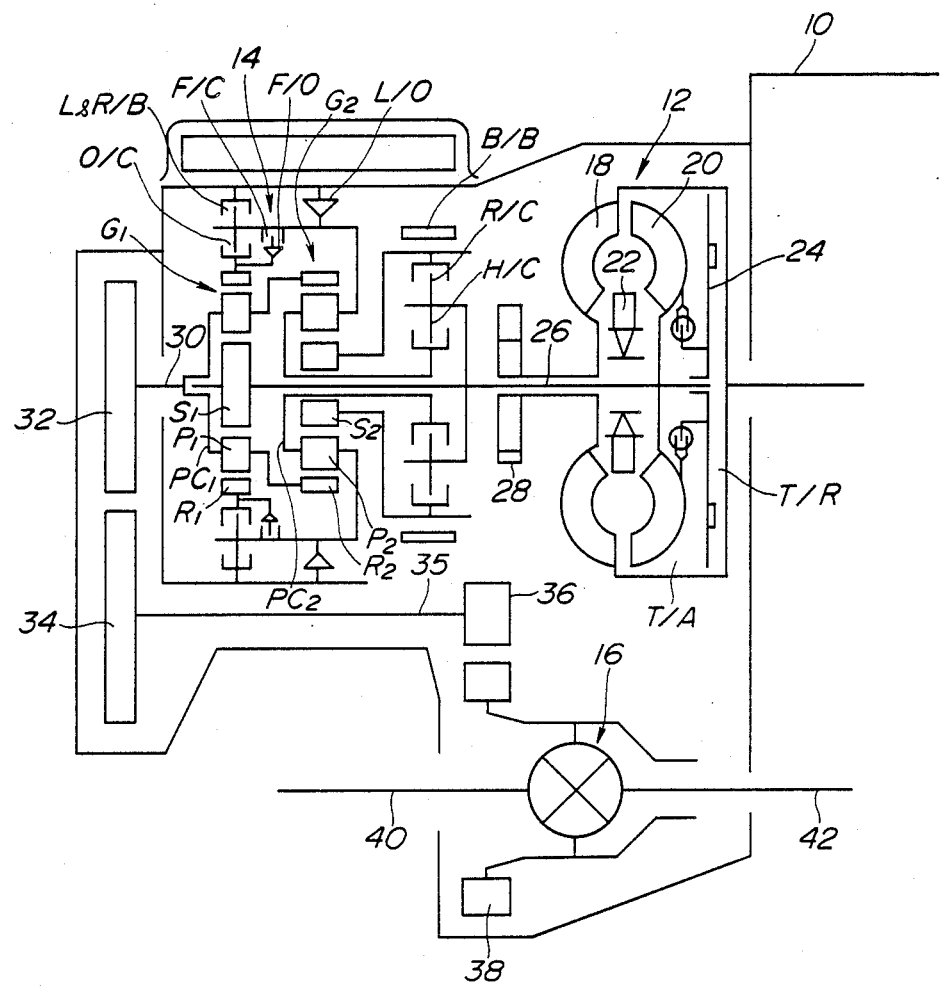
FIG. 2 is a schematic elevation showing a transaxle of the type to which the embodiment of the present invention can be applied.

FIG. 2 shows in schematic elevational form, an automatic transaxle which includes a torque converter 12, a planetary gear train and a differential or final drive unit 16. This unit is arranged traversely across the vehicle chassis and is connected to an engine 10 at one end thereof. The torque converter (T/C) in this instance includes a pump impeller 18, turbine runner 20, stator 22 and a lock-up clutch 24. With this arrangement, when the lock-up clutch 24 is disengaged, torque from the engine crankshaft (no numeral) is supplied by way of the pump impeller 18 to a transmission input shaft 26. However, upon engagement of the lock-up clutch the torque is supplied directly to the input shaft 26.

In this transaxle the lock-up clutch is arranged to be responsive to the pressure differential which exists between an apply chamber A/T and a release chamber T/R. It should be noted that oil pump 28 which outputs pressurized hydraulic fluid is arranged to be driven by the T/C.

The planetary gear train includes first and second gear units G1, G2. The first unit G1 includes a sun gear S1, an internal or ring gear R1 and pinion gears P1 which establish mesh with the ring and sun gears. The pinion gears are of course are rotatably disposed on a pinion carrier PC1. The second unit G2 similarly includes a sun gear S2, a ring gear R2, pinion gears P2 and a carrier PC2.

The sun gear S1 of the first unit G1 is connected to the input shaft 26 in a manner to undergo synchronous rotation therewith while pinion carrier PC1 and the ring gear R2 of the second unit G2 are connected with a transmission output shaft 30. The ring gear R1 of the first unit G1 is selectively connectable with carrier PC2 by way of the forward oneway cluch F/O and the overrunning clutch O/C. Sun gear S2 is selectively connectable with input shaft 26 by way of the reverse clutch R/C while the pinion carrier PC2 is arranged to be connectable with the same via a high clutch H/C.

Sun gear S2 can be selectively rendered stationary via the application of a band brake B/B while the pinion carrier PC2 is operatively connected with the parallely arranged low one-way clutch L/O and low and reverse brake L&R/B in a manner which enables the same to be selectively held stationary.

Output gear 32 is fixed to one end of output shaft 30 and arranged to mesh with an idler ger 34. The latter mentioned gear is fixed to one end of a idler shaft 35 which extends parallel to the input shaft 26 and passes back through the transmission as shown. A reduction gear 36 is provided at the inboard end of the idler shaft 35. This gear meshes with a ring gear 38 of the differential unit 16.

Torque is delivered to the wheels of the vehicle by way of stub shafts 40 and 42. In this instance the shafts 40 and 42 are respectively connected with the forward left and right hand wheels of the vehicle.

With the above described arrangement, selective engagement and/or use of the clutches F/C, H/C, O/C, R/C, the brakes B/B and L&R/B and the one-way clutches F/O and L/O it is possible to condition the first and second planetary gear units G1 and G2 to produce four forward and one reverse gear ratios in the manner as depicted in the table shown in FIG. 4.

It should be noted that in this table the circles denote the engagement of an element and or the use of a one-way clutch. In this transmission the engagement of the band brake B/B is controlled by a servo, having first, second and third chambers. That is, a second speed apply chamber 2A, a third speed release chamber 3R and a fourth speed application chamber 4A. In connection with these chambers the circular indicia in the table indicate that the chamber is being applied with hydraulic pressure. Further, the table shows alpha 1 and alpha 2 which indicate the ratios of the teeth on ring gears R1 and R2 and the corresponding sun gears S1 and S2, respectively. The gear ratio defined in the table denote the ratios defined between the rotational speeds of the output and input shafts 30, 26.

With the above described transmission arrangement, rotational power or torque is transferred via the gear train from input shaft 26 to output shaft 30 and to the final drive or differential unit 16 by way of output gear 30, idler gear 34, reduction gear 36 and ring gear 30. In fourth speed an overdrive condition is established.

Figure 3:
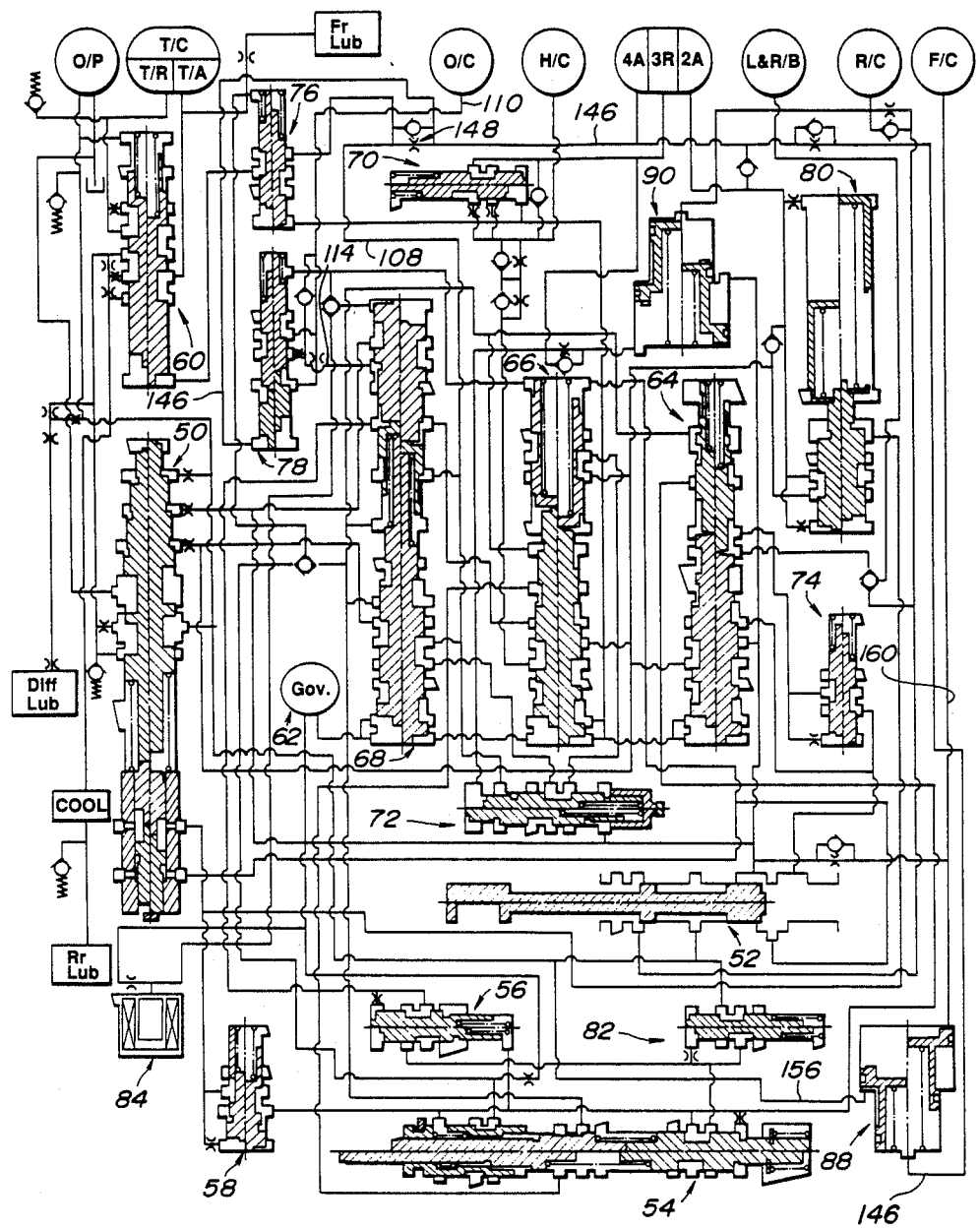
FIG. 3 is a schematic plan view showing a control circuit of the type which is used to control the transmission of the transaxle arrangement shown in FIG. 2 and which incorporates the embodiment of the present invention.

In order to control the above described gear train a hydraulic spool valve system of is used, the nature of which is shown in FIG. 3.

This system includes a pressure regulator valve 50, a manual valve 52, a throttle valve 54, a throttle modifier valve 58, lock-up control valve 60, a governor valve 62, a 1-2 shift valve 64, a 2-3 shift valve 66, a 3-4 shift valve 68, a 3-2 timing valve 70, a 4-2 sequence valve 72, a fixed first speed pressure reducing valve 74, a speed cut-back valve 76, an overrunning clutch control valve 78, a 1-2 accumulator valve 80, a kickdown modifier valve 83, an N-D accumulator 88 and a servo release accumulator 90.

Figure 1:
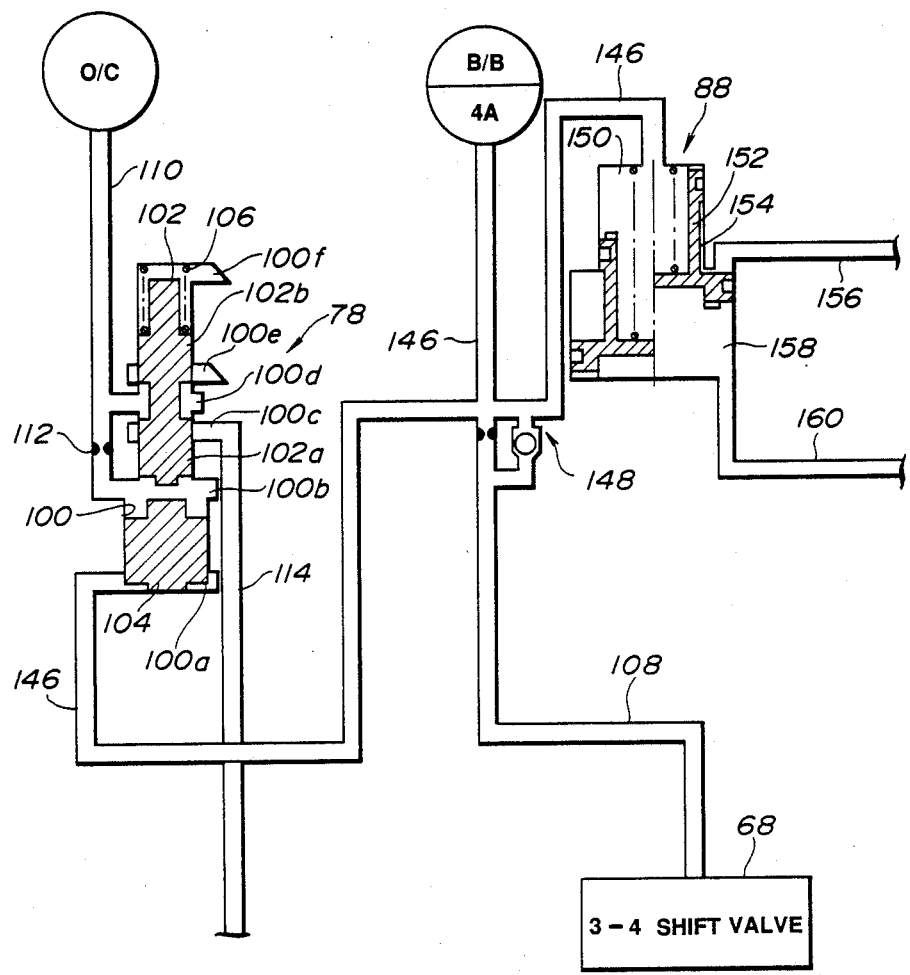
FIG. 1 shows is schematic cross-sectional elevation the arrangement of a overrunning control valve 78 valve according to a first embodiment of the present invention.

FIG. 1 shows an embodiment of the present invention. In this arrangement when the 3-4 shift valve assumes its upshift position, line pressure is supplied into conduit 108 and passes by way of one-way orifice 148 and conduits 146 to the fourth speed application chamber 4A of band brake B/B and to chamber 150 of accumulator 88. It will be noted that the one-way orifice is such that the hydraulic fluid can be readily supplied toward the above mentioned elements without restriction. On the other hand, the flow of hydraulic fluid back toward shift valve 68 is restricted and draining of the aforementioned elements is effected. The accumulator 88 includes a stepped piston 152. The small diameter end of the piston is arranged to be exposed to the pressure supplied via conduits 146 into chamber 150 while intermediate chamber 154 which is defined beween the large diameter end and small diameter lands of piston is arranged to receive unmodified line pressure via conduit 156. Chamber 158 which is defined in the stepped accumulator bore by the piston, is arranged to receive pressurized hydraulic fluid while the transmission is conditioned to produce forward speeds. In addition to the above mentioned elements, the fluid circuit defined by conduits 146 also communicate with port 100a of the overrunning clutch control valve 78.

Clutch 78 includes a bore 100 in which a first spool valve element 102, second spool valve element 104 and a spring 106 are disposed. The bore 100 is formed with ports 100a to 100f. Port 100a communicates with conduit 146 as previously mentioned, ports 100b and 100d communicate with the overruning clutch O/C via conduit 110. It should be noted that an orifice 112 is arranged to control the amount of hydraulic fluid which flows in and out of port 100b.

Port 100c is arranged to communicate with conduit 114 which is supplied with hydraulic fluid when the select lever is moved to the third speed range. Port 100e and 100f function as drains.

The first spool valve element 102 is provided with lands 102a and 102b which are arranged to communicate with the ports in the manner illustrated in FIG. 1. Spring 106 is arranged to bias the first spool valve element downward (as seen in the drawings) toward the second spool valve element 104. The lands of the first spool valve element are arranged to have the same diameter and to be smaller than the diameter of the single land formed on the second spool valve element 104.

The operation of this embodiment is as follows: when the transmission is in fourth speed and hydraulic fluid is applied through conduit 108 from the 3-4 shift valve 68, line pressure is transmitted via the one-way valve 148 into conduits 146 and the fourth speed application chamber 4A of the band brake B/B. At the same time accumulator piston 152 is induced to assume the position shown by the left-hand section, and port 100a of the overrunning control valve 78 is pressurized to line pressure level. As a result of, the second spool valve element 104 of the overrunning control valve 78 is induced to move upwardly into contact with the first spool valve element 102 and to move in the same manner against the bias of the spring 106. As a result, ports 100d and 100e are placed in communication with each other and the overrunning clutch is drained via port 100e.

When the select lever is moved into manual third speed range while the transmission is conditioned to produce fourth speed, the 3-4 shift valve 68 moves toward its downshift position and at the same time conduit 114 is supplied with hydraulic fluid. When shift valve 3-4 assumes its downshift position conduit 108 is drained. However, the presure in conduit 146 does not drop immediately due to the provision of the one-way orifice 148 and the provision of the accumulator 88. At the same time accumulator piston 154 is in the position shown in the left hand section and wherein the volume of chamber 150 is maximized. As piston 154 strokes upward, conduits 146 are supplied with hydraulic fluid and as a result the level of the pressure in the same lowers gently. As conduits 146 came into communication with port 100a of the overrunning control valve 78, the pressure which biases the second spool valve element 104 upward also slowly decreases.

When the pressure in conduits 146 lowers below a predetermined level the spool valve elements 102 and 104 begin to be biased downward by the spring 106. When the first spool valve element lowers to the point that land 102a opens port 100c, the hydraulic fluid which has been supplied into conduit 114 begins to be supplied into bore 100. As the same time, land 102b begins to close drain port 102b and the amount of hydraulic fluid that is drained is reduced. The pressure which is discharged from port 100d toward the overruning clutch is also fed into a chamber defined between the first and second spool valve elements by way of orifice 112 and port 100b. The first and second spool valve elements accordingly separate and the first spool valve element produces a pressure modulation effect. The pressure which is supplied to the overrunning clutch O/C is controlled to a predetermined level which is determined by the strength of spring 106.

In summary, after the pressure prevailing in conduits 146 and in the fourth speed apply chamber 4A of the band brake B/B, has lowered sufficiently, the overrunning clutch O/C is supplied with a pressure which is held at a predetermined level. Accordingly, as the band brake B/B assumes a disengaged condition the overruning clutch O/C assumes an engaged one. This of course prevents both of the friction elements from being engaged at the same time and attenuates shift shock. Further, since the level of pressure supplied to overruning clutch O/C is determined by the strength of spring 106, it is possible by changing the spring, to selectively change the amount of torque which the overruning clutch is capable of handling. This also permits the transmission to be tuned, via selection of the appropriate spring, in a manner which minimizes shift shock.

It should be noted that (according to the present invention) it is possible to modify the force applied by spring 106 by selectively supplying port 106 with an appropriate hydraulic fluid pressure.

With the present invention it is also possible for a single valve to provide a dual function wherein the timing with which the overrunning clutch is supplied with a predetermined level of pressure is determined in accordance with the disengagement of the band brake B/B. This permits the size and complexity of the transmission control circuit to be reduced.

I claim:

1. In a transmission having a friction element and an overrunning clutch which produces engine braking when engaged;
   an overrunning clutch control valve, and an accumulator which is pressurized when said friction element is engaged;
   said overrunning control valve including a bore in which first and second spool valve elements are reciprocatively disposed, said second spool valve element having a diameter which is larger than that of the first spool valve element, said first and second spool valve elements being arranged so that when said transmission is conditioned to produce a predetermined speed said first spool valve element modifies a supply of hydraulic pressure under pressure in a manner which supplies a pressure having a predetermined level to said overrunning clutch; and
   said first and second spool valve elements being arranged so that when said first spool valve element is engaged by said second spool valve element in a manner biased by the engagement, the supply of said predetermined pressure to said overrunning clutch is cutoff, said second spool valve element being exposed at one end to the pressure in said friction element in a manner biased toward said first spool valve element.

2. In a transmission
   a first friction element, said first friction element inducing a nth speed when engaged;
   an accumulator associated with said first friction element, said accumulator being arranged to be pressurized when said first friction element is engaged;
   a shift valve;
   conduit means for fluidly communicating said shift valve with said first friction element and said accumulator, said shift valve being arranged to supply hydraulic pressure to said first friction element and said accumulator when conditioned to assume a nth speed position, said conduit means being arranged to permit hydraulic pressure to be supplied freely from said shift valve and to restrict the drainage of hydraulic pressure via said shift valve when said shift valve is conditioned to assume a n-1 speed position;

a second friction element, said second friction element inducing engine braking when engaged and said transmission produces an n-1 speed;

a control valve valve interposed between a source of hydraulic pressure and said second friction element, said control valve comprising:

a first spool valve element reciprocatively disposed in a bore, said first spool valve element being arranged to have a first position wherein said second friction element is drained and a second position wherein communication between said source and second friction element is established and the pressure which is supplied to said second friction element is controlled to a predetermined level;

a spring which biases said first spool valve element toward said second position;

a second spool valve element, said second spool valve element being exposed to the pressure which prevails in said first friction element in a manner wherein, while the pressure which is prevailing in said first friction element is above a predetermined level, said second spool valve element is biased toward and into engagement with said first spool valve element with sufficient force to overcome said spring and to move said first spool valve element into said first position.

3. A transmission as claimed in claim 2 wherein said first and second spool valve elements are arranged to define therebetween a feedback chamber which is supplied with the pressure which is supplied to said second friction element, said first spool valve element being arranged to be biased toward said first position by the pressure prevailing in said feedback chamber.

4. A transmission as claimed in claim 3 wherein said second spool valve element has a larger diameter than the first spool valve element, said second spool valve element being disposed in said bore in a manner wherein oen end thereof is exposed to a chamber which is fluidly communicated with said conduit means and exposed to the pressure which prevails in said first friction element.

5. A transmission as claimed in claim 4 wherein said first spool valve element has first and second lands, said first and second lands having the same diameter, said first land being arranged to control a drain port formed in said bore and said second land being arranged to control a supply port which is communicated with said source, said first spool valve element being arranged so that in said first position said drain port is open and said supply port is closed, the space defined between said first and second lands being in constant communication with said second friction element.

6. A transmission as claimed in claim 2 wherein said conduit means includes a one-way valve, said one-way valve being disposed between said shift valve and said control valve, first friction element and said accumulator, said one-way valve being arranged so that as said accumulator discharges hydraulic fluid, the pressure prevailing in said conduit means upstream of said one-way valve is temporarily maintained above that prevailing between said one-way valve and said shift valve.

* * * * *